Patented Jan. 2, 1940

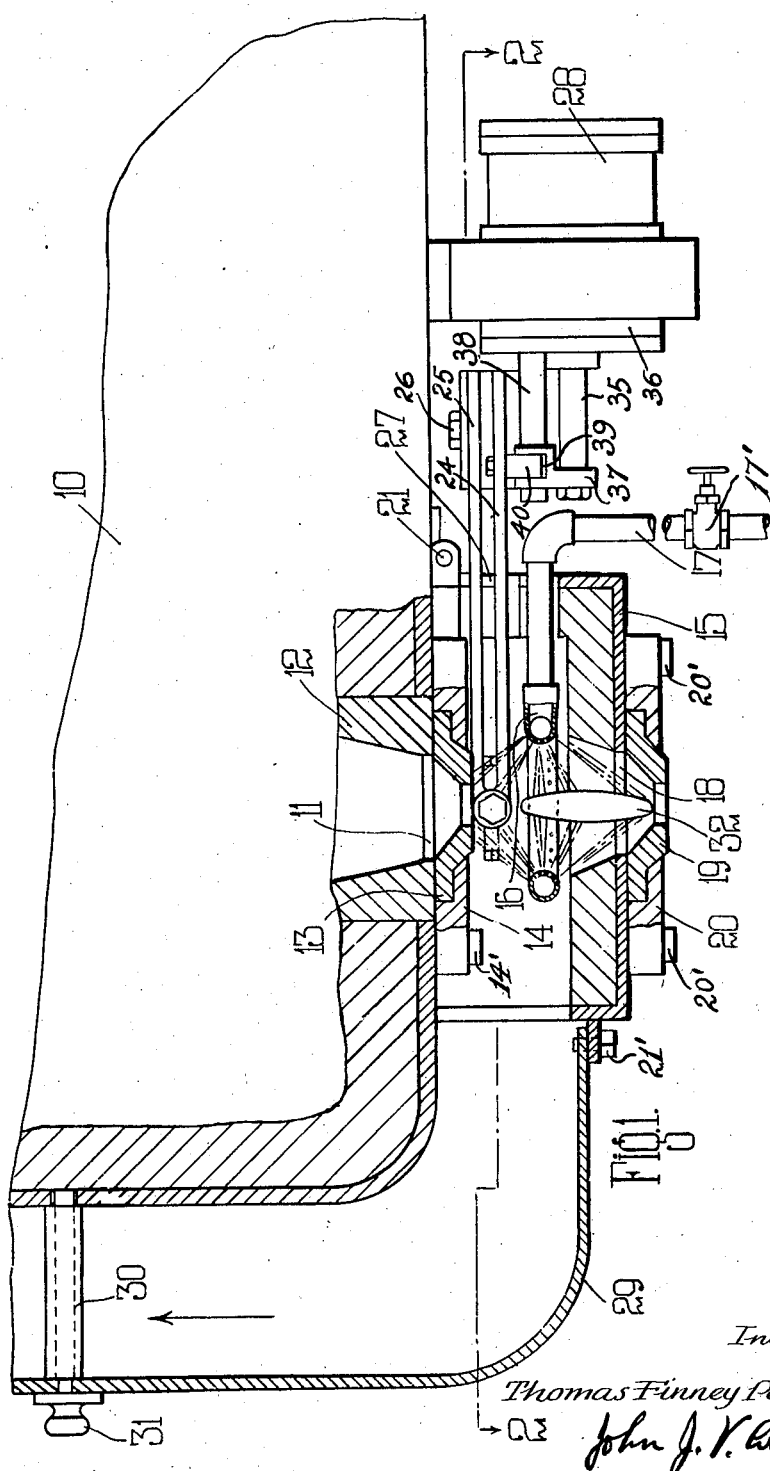

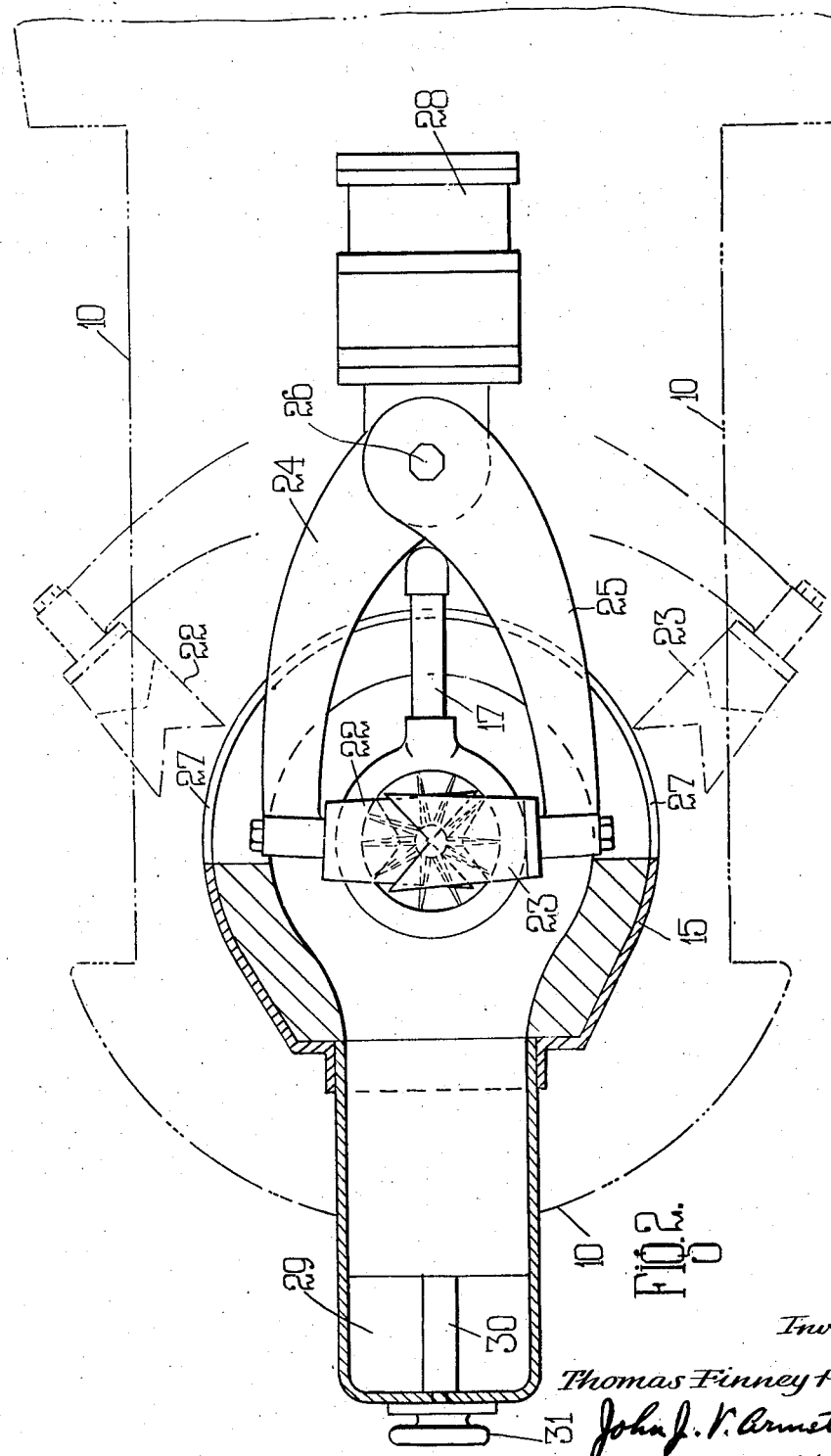

2,185,565

UNITED STATES PATENT OFFICE 2,185,565

APPARATUS FOR FEEDING MOLTEN GLASS

Thomas Finney Pearson, Pontefract, England, assignor to Crown Cork & Seal Company, Inc., New York, N. Y., a corporation of New York Application January 26, 1937, Serial No. 122,457 In Great Britain February 7, 1936

8 Claims. (Cl. 49—55)

The present invention relates to the manufacture of moulded articles and in particular to bottles and other hollow glassware.

Where molten material such as glass is withdrawn from a furnace and is sheared to form gathers which are subsequently fed to moulds wherein they are shaped, difficulty exists in that the shears have a detrimental effect on the gathers in the region where the charges are cut and this effect does not disappear by the time the gathers are shaped within the moulds, with the result that when the articles to be produced consist of bottles and the like glass-ware blemishes are readily apparent in the articles at one end thereof, which may either be the base or the neck.

The primary object of the present invention is to overcome this disadvantage.

According to the present invention and from one aspect thereof a forehearth of a furnace in the region of the exit orifice thereof through which charges are withdrawn and sheared is provided with a casing having a bottom wall in spaced relationship with the wall of the forehearth through which space each gather must pass before being picked up for moulding purposes, means being provided to re-form the shape of the gather after shearing in order to remove the detrimental effect on the sheared end of the gather caused by the shears before each gather passes beyond the casing.

From another aspect of the present invention each gather as it descends from the exit orifice of a forehearth to a mould or other receptacle is cut, and thence passed through an enclosed heated zone for re-heating and re-shaping purposes.

In a preferred form of construction a casing is provided externally of the forehearth of the furnace which is disposed in spaced relationship both as regards the base of the forehearth and the wall thereof, whereby a compartment is formed around the sides of the forehearth and the base through which individual gathers after being sheared must pass in their descent to a parison or other mould for subsequent moulding into the form of a bottle or other hollow article of glassware.

The casing is provided with an orifice directly below that of the forehearth while the shears are operable within the space between the bottom wall of the casing and the base of the forehearth, burners being preferably provided beneath the shears so as to maintain the heated zone through which the gather must travel in its passage between the orifice of the forehearth and that in the casing.

The invention is more particularly described with reference to the accompanying drawings, in which:

Figure 1 is an elevation partly in section of a base of a furnace forehearth, with the enclosed heated zone and the shears therein below the feed orifice from the forehearth.

Figure 2 is a section on the line 2—2 of Fig. 1.

In the drawings a forehearth 10 has an exit orifice 11 which is bounded internally of the forehearth by a bushing 12 and externally of the forehearth by a removable bushing 13 which is carried by a support 14 pivoted at 21 and held in the position shown, by bolts 14' or the like.

A casing 15 is provided externally of the forehearth of the furnace to form between it and the forehearth an enclosed zone adapted to be heated by a burner 16 which is supplied with its heating medium, such as gas, through a conduit 17.

The casing 15 has an orifice 18 in its bottom wall, defined by a bushing or orifice ring 19 held in position by a support 20. The latter is bolted to the bottom of a casing by bolts 20' so that the support may be removed and a bushing of different size substituted. The casing 15 and the parts supported thereby are pivoted about the axis 21 which also serves as the pivotal support for the member 14 carrying the orifice ring 13. The casing may be held in the upper, operative position as shown by any suitable means, such as a bolt 21' secured to the flue 29, hereinafter referred to.

The orifice ring 19 may be removed by unscrewing the bolts 20' and removing the supporting bracket 20. When it is desired to remove the orifice ring 13, for replacement or repair, the burner 16 and its supply pipe 17 should first be removed through the opening 27 in the side of the casing. Next, the bolt 21' should be removed, whereupon the casing 15 may be swung downwardly about the axis 21 to give access to the bolt 14'. When the latter is loosened, the support 14 and the bushing 13 may likewise be swung downwardly about the axis 21.

When in the position shown in Figure 1 of the drawings, however, the orifices 11, 18 and the circular burner 16 are disposed in co-axial relationship so as not to interfere with the direction of the charge of molten glass withdrawn from the forehearth when the same descends through the exit orifice 11.

A shearing mechanism is disposed between the burner 16 and the bushing 13 of the exit orifice 11, such shearing mechanism consisting of shear blades 22, 23, carried by arms 24, 25, respectively, the arms being adapted to pivot about a centre 26 so that the blades 22, 23, move in an arcuate path through an arcuate opening 27 extending substantially over that half of the periphery of the casing at the right hand end thereof, and overlap at a position co-axial with the exit orifice 11 of the forehearth. In addition, the shears when in the overlapping position shown in full lines in Figure 2 are adapted to be withdrawn from the space between the casing and the base of the forehearth through the arcuate opening 21. The operating mechanism for the shears is diagrammatically illustrated at 28, and may be generally similar to that shown in my copending application Serial No. 162,743, filed September 7, 1937. A piston rod 35 associated with an air cylinder 36 carries a cross head 37 guided longitudinally along a bracket 38 and provided with a transverse slot 39. The shear arms 24, 25 carry downwardly projecting rollers 40 which are positioned in said slot. Hence, horizontal reciprocations of the piston rod 35 and of the cross head 37 transmit swinging movement to the blades about the axis 26.

In accordance with the usual practice in so far as exit orifices of forehearths are concerned, the bushing 13 may be replaced by one of a different bore, and in the present invention this applies also with regard to the bushing 19.

Replacement of the bushing 13 may be effected when the shears are in their open position shown in chain dotted lines in Figure 2, that is to say when they have passed in an arcuate direction through the opening 27 of the liner or casing, access to the bushings being effected by swinging the casing 15 and the supporting bracket 14 about the pivot 21. If desired, however, the entire shear mechanism may be withdrawn bodily, when the blades are in a closed position, by moving the mechanism on its supporting structure in a linear direction, thereby moving the blades through the opening 27. The casing may then be swung downwardly about its pivot. It will be appreciated that in each shearing cycle of the shears, they move to and from the chain dotted position in order to effect shearing of a charge passing through the exit orifice 11 of the furnace.

The left hand of the casing 15 is in communication with a flue 29 the exhaust through which is controlled by a damper 30 externally operated from a control 31. If desired, the end of the flue may be utilized as the support for the casing 15, to hold it in its closed position and to prevent inadvertent downward pivoting movement thereof.

In operation, molten glass is fed through the exit orifice 11 of the furnace and on descent through the bushing 13 is cut by the shears 22, 23. The gather shown at 32 then descends by gravity through the burner 16 towards the bushing 19. During such descent the heat generated by the burner 16 re-melts the sheared end of the gather. By virtue of the fact that the bushes 13, 19 are maintained hot and the temperature within the space enclosed by the casing 15 is controlled, the shape of the gathers at the sheared end is reformed and they are given a clean highly glazed surface. The act of shearing may be performed while the lower end of the molten glass lies within the bush 19 of the casing 15.

If desired, the burner 16 may be supplied with fuel from the same source as that of the forehearth itself and conventional control means, represented diagrammatically by the valve 17', may be provided for the burners of the forehearth and for the burner 16 thereby ensuring maintenance of the required temperature within the casing 15 compatible with the temperature within the forehearth.

I declare that what I claim is:

1. A feeder for molten glass comprising a forehearth having an exit orifice for molten glass, a bracket pivoted on the undersurface of the forehearth, a bushing carried by the bracket, defining the margin of said orifice, a unitary casing separate and independent from the forehearth and pivotally supported on the undersurface of the floor of the forehearth, said casing having a bushing supported by its bottom wall defining an orifice coaxially aligned with the first-mentioned orifice, shears displaceable between the bottom of said casing and said forehearth adjacent said exit orifice of said forehearth, means to operate said shears to effect a cutting operation on said glass to produce gathers on entry of the glass within said casing through said exit orifice of said forehearth, heating means within said casing to heat said gathers subsequent to shearing, means for controlling said heat and a controlled flue leading from said heated zone.

2. A feeder for molten glass comprising a forehearth having an exit orifice for molten glass, a unitary casing pivotally mounted on the undersurface of the floor of the forehearth, a bushing in the bottom of the casing defining an orifice of substantially the same size as and positioned in spaced relationship with respect to said forehearth orifice and coaxial therewith, shears displaceable into said casing and below said forehearth adjacent said exit orifice of said forehearth, means to operate said shears to effect a cutting operation on said glass to produce gathers on entry of the glass within said casing through said exit orifice of said forehearth, heating means within said casing and surrounding the common axis of said exit orifices for heating said gathers descending longitudinally of said axis through said zone subsequent to shearing, and means for controlling said heat.

3. A feeder for molten glass comprising a forehearth having a discharge opening in its floor, a unitary casing structure hung from the undersurface of the forehearth and positioned immediately below said floor, an orifice ring removably mounted in the bottom wall of the casing, defining a lower discharge opening and aligned coaxially with said discharge opening in the forehearth floor, said casing having a pair of spaced openings in its side walls, burner means in said casing, shears normally disposed exteriorly of said casing, means for projecting said shears into the casing through one of said side wall openings to a shearing position aligned with said discharge openings, and a flue connected to the other side wall opening.

4. An apparatus for delivering mold charges of molten glass, comprising a forehearth having a discharge opening in its floor, an orifice ring defining the margins of said opening, a bracket pivoted on the undersurface of the forehearth floor and serving to hold said ring in registry with said opening, a unitary casing structure pivoted on the undersurface of the forehearth floor on the same axis as said bracket for movement toward and from said opening, said casing having an orifice ring defining a discharge opening in its bottom aligned coaxially with the first mentioned orifice ring and having a pair of openings in its side walls, heating means in the casing, shears normally disposed exteriorly of said casing but constructed and arranged to be projected through one of the side wall openings to a shearing position aligned with said discharge openings, and means connected to the other of said side wall openings for carrying off excess heat from said heating means.

5. An apparatus for delivering mold charges of molten glass comprising a forehearth having an opening in its floor, a unitary casing structure pivoted on the undersurface of said floor for movement toward and from said opening, said unitary structure comprising means for supporting a pair of orifice rings in axially aligned spaced relation, the upper ring being positioned to register with said opening when the casing structure is in its upwardly pivoted position, said casing structure having a pair of spaced openings in its side walls serving respectively as a shear opening and as a flue opening.

6. A feeder for molten glass comprising a forehearth having an opening in its floor, a casing pivoted on the undersurface of said floor and adapted to surround said opening when in its upper, operative position, heating means for the casing, and shears adapted to be projected into the casing to shear mold charges in the vicinity of said heating means, said casing including an upper bracket, an orifice ring removably supported in said bracket and adapted to register with said opening to define the effective diameter thereof, a lower supporting bracket associated with the bottom wall of said casing and a lower orifice ring removably carried thereby in axial alignment with and spaced from the first mentioned orifice ring.

7. A feeder for molten glass comprising a forehearth having a discharge opening in its floor, a casing pivotally mounted on the undersurface of said floor and having a discharge orifice coaxially aligned with the first mentioned orifice, said casing having a pair of spaced openings in its vertical side walls, burner means projecting through one of said openings and axially aligned with the discharge openings, a flue conduit positioned exteriorly of the side walls of the forehearth and having an open end positioned to register with the other opening in the side wall of the casing when the casing is in its upwardly pivoted, operative position, and damper means in said flue conduit to control the egress of the gases from said burner means.

8. A feeder for molten glass comprising a forehearth having a discharge opening in its floor, a unitary casing structure separate and independent from the forehearth and removably supported by and immediately below said floor and having an opening in its bottom wall aligned coaxially with said discharge opening, said casing structure having an elongated, horizontally disposed opening in its side wall, heating means in the casing structure, and shear mechanism disposed exteriorly of said casing structure, said mechanism comprising a pair of arms mounted for oscillation about a vertical axis disposed exteriorly of said casing structure and shear blades carried at the ends of said arms, and means for swinging said arms and blades about said axis, inwardly through said opening in the side wall of the casing structure to a shearing position aligned with said coaxially arranged openings, said casing structure being removable as a unit when the arms are in their outwardly swung position.

THOMAS FINNEY PEARSON.